US007978130B1

(12) United States Patent
Cohen et al.

(10) Patent No.: US 7,978,130 B1
(45) Date of Patent: Jul. 12, 2011

(54) PRACTICAL METHOD FOR UPGRADING EXISTING GNSS USER EQUIPMENT WITH TIGHTLY INTEGRATED NAV-COM CAPABILITY

(75) Inventors: Clark E. Cohen, Washington, DC (US); Todd E. Humphreys, Half Moon Bay, CA (US); Brent M. Ledvina, San Francisco, CA (US); William J. Bencze, Half Moon Bay, CA (US); Mark L. Psiaki, Brooktondale, NY (US); Bryan T. Galusha, Oakland, CA (US)

(73) Assignee: Coherent Navigation, Inc., San Mateo, CA (US)

( * ) Notice: Subject to any disclaimer, the term of this patent is extended or adjusted under 35 U.S.C. 154(b) by 319 days.

(21) Appl. No.: 12/434,026

(22) Filed: May 1, 2009

(51) Int. Cl.
*G01S 19/18* (2010.01)
*G01S 19/25* (2010.01)
*G01S 19/33* (2010.01)

(52) U.S. Cl. ......... 342/357.56; 342/357.64; 342/357.69; 342/357.73; 342/357.75

(58) Field of Classification Search ............. 342/357.28, 342/357.29, 357.41, 357.42, 357.46, 357.56, 342/357.64, 357.68, 357.69, 357.71–357.73, 342/357.75–357.77; 701/213–216; *G01S 19/18, G01S 19/25, 19/30, 19/31, 19/33, 19/35, G01S 19/46*
See application file for complete search history.

(56) References Cited

U.S. PATENT DOCUMENTS

| 4,972,431 A * | 11/1990 | Keegan ...................... 375/150 |
| 5,812,961 A | 9/1998 | Enge et al. |
| 5,886,665 A | 3/1999 | Dosh et al. |
| 6,167,347 A * | 12/2000 | Lin .............................. 701/214 |
| 6,182,011 B1 * | 1/2001 | Ward ........................... 701/213 |
| 6,373,432 B1 | 4/2002 | Rabinowitz et al. |
| 6,377,892 B1 * | 4/2002 | Johnson et al. ............... 701/213 |
| 6,577,951 B1 * | 6/2003 | Johnson et al. ............... 701/213 |
| 6,590,524 B1 | 7/2003 | Farley et al. |
| 6,934,631 B2 * | 8/2005 | Dentinger et al. ............ 701/213 |
| 7,283,090 B2 * | 10/2007 | Dentinger et al. ....... 342/357.21 |
| 7,372,400 B2 | 5/2008 | Cohen et al. |
| 2002/0156556 A1 | 10/2002 | Ruffner |
| 2005/0163201 A1 * | 7/2005 | Krasner ........................ 375/150 |
| 2006/0074558 A1 | 4/2006 | Williamson et al. |
| 2006/0114984 A1 * | 6/2006 | Gaal et al. ...................... 375/240 |

(Continued)

OTHER PUBLICATIONS

Notification of Transmittal of the International Search Report and the Written Opinion of the International Searching Authority, or the Declaration; Official Action Dated Jan. 11, 2011.

(Continued)

*Primary Examiner* — Thomas H Tarcza
*Assistant Examiner* — John B Vigushin
(74) *Attorney, Agent, or Firm* — Bacon & Thomas, PLLC

(57) ABSTRACT

A practical method for adding new high-performance, tightly integrated Nav-Com capability to any Global Navigation Satellite System (GNSS) user equipment requires no hardware modifications to the existing user equipment. In one example, the iGPS concept is applied to a Defense Advanced GPS Receiver (DAGR) and combines Low Earth Orbiting (LEO) satellites, such as Iridium, with GPS or other GNSS systems to significantly improve the accuracy, integrity, and availability of Position, Navigation, and Timing (PNT) and to enable new communication enhancements made available by the synthesis of precisely coupled navigation and communication modes. To achieve time synchronization stability between the existing DAGR and a plug-in iGPS enhancement module, a special-purpose wideband reference signal is generated by the iGPS module and coupled to the DAGR via the existing antenna port.

49 Claims, 6 Drawing Sheets

U.S. PATENT DOCUMENTS

2007/0159392 A1     7/2007   Vallot
2007/0211791 A1*   9/2007   Ganguly et al. .............. 375/148
2009/0112471 A1     4/2009   Hayashi

OTHER PUBLICATIONS

"Iridium Satellite LLC Estimates Constellation Life Span to Extend Beyond Original Predictions,"; Iridium Satellite LLC Press Release; Arlington, VA; Feb. 26, 2003.

"Rockwell Collins delivers 200,00th DAGR and 40,000th GPS Engine to The U.S. Army"; Rockwell Collins Press Release; Coralville, IA; Apr. 18, 2008.

Working Document on Service Link Characteristics of the Iridium Satellite System; U.S. WP 7D/14R2; Feb. 11, 2005.

G. Gibbons; "Boeing Wins NRL Contract to Continue Iridium/GPS Development"; Inside GNSS; Sep./Oct. 2008.

* cited by examiner

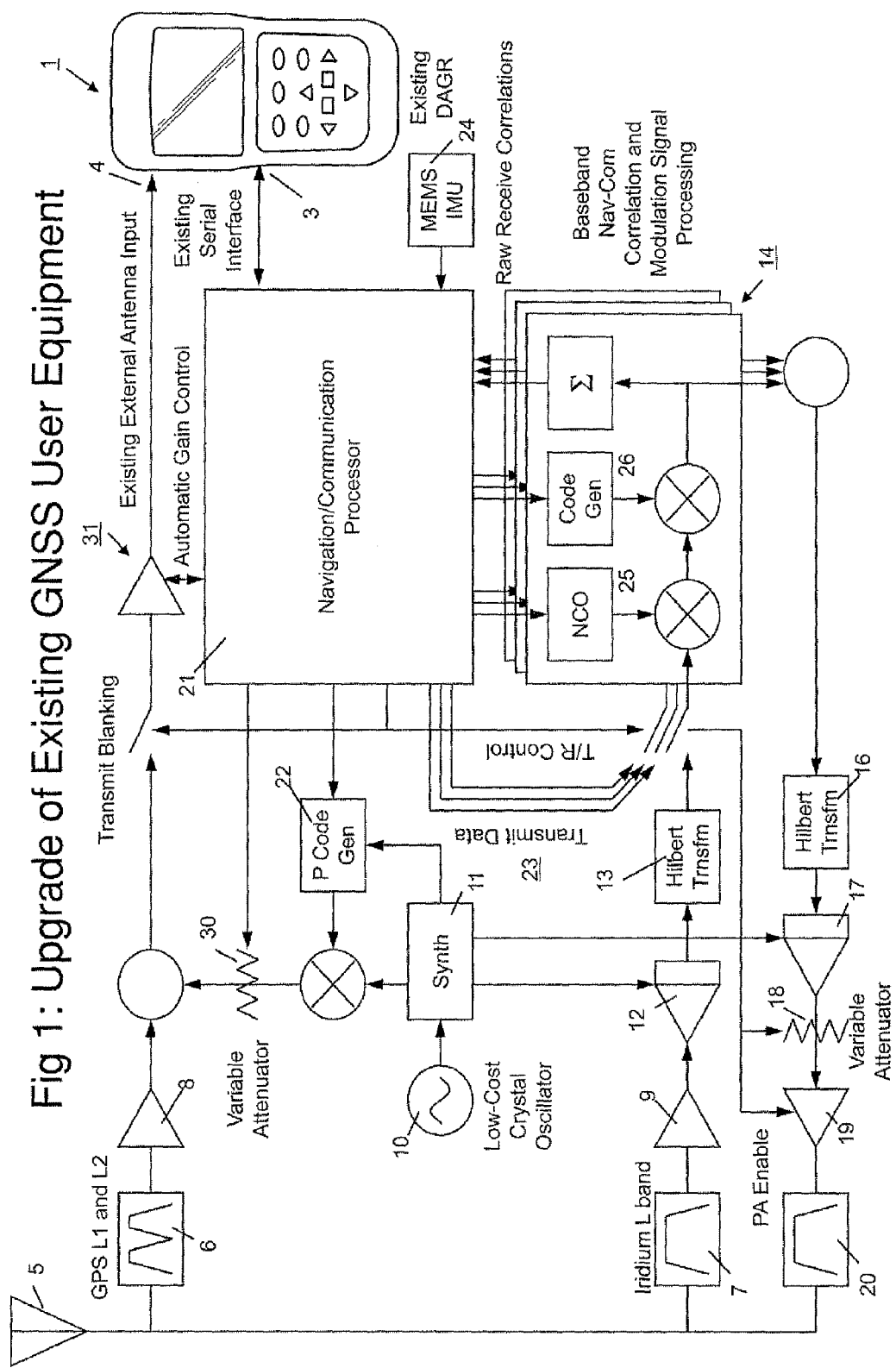

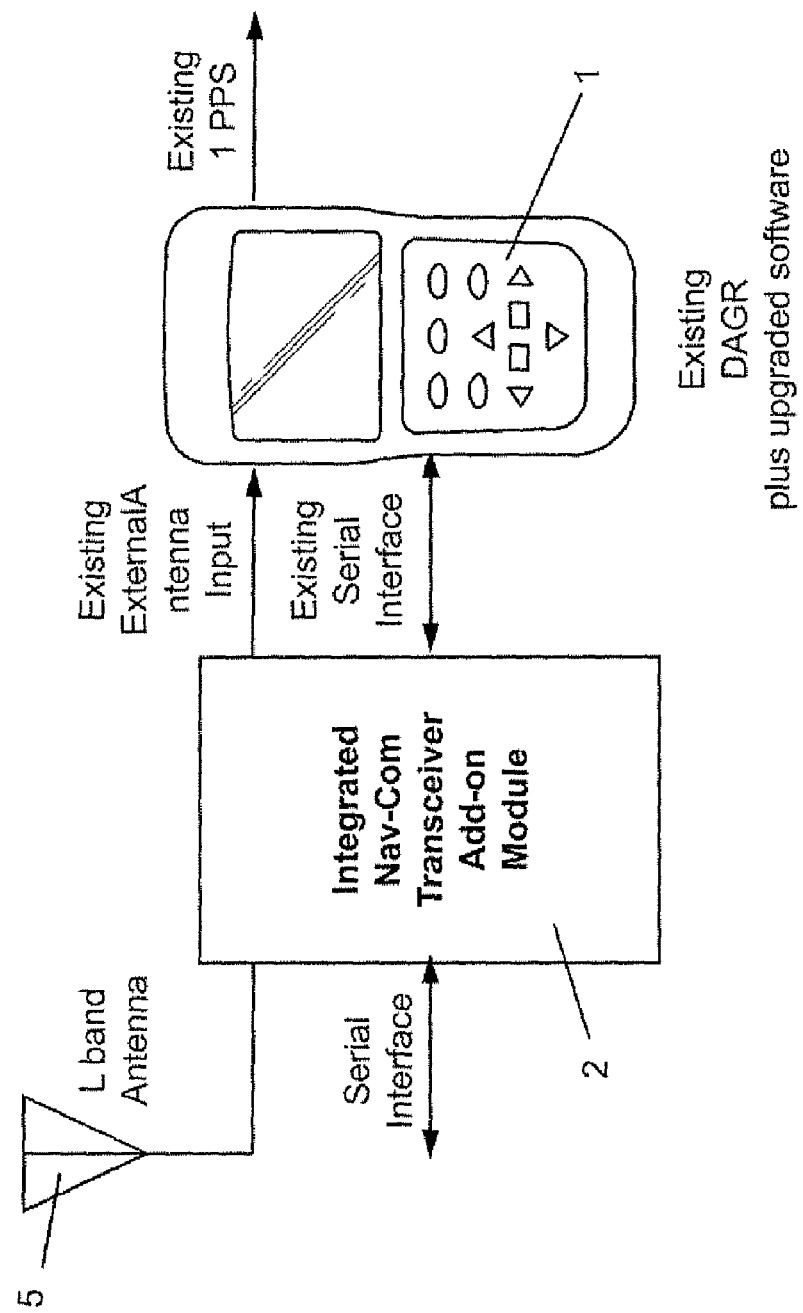

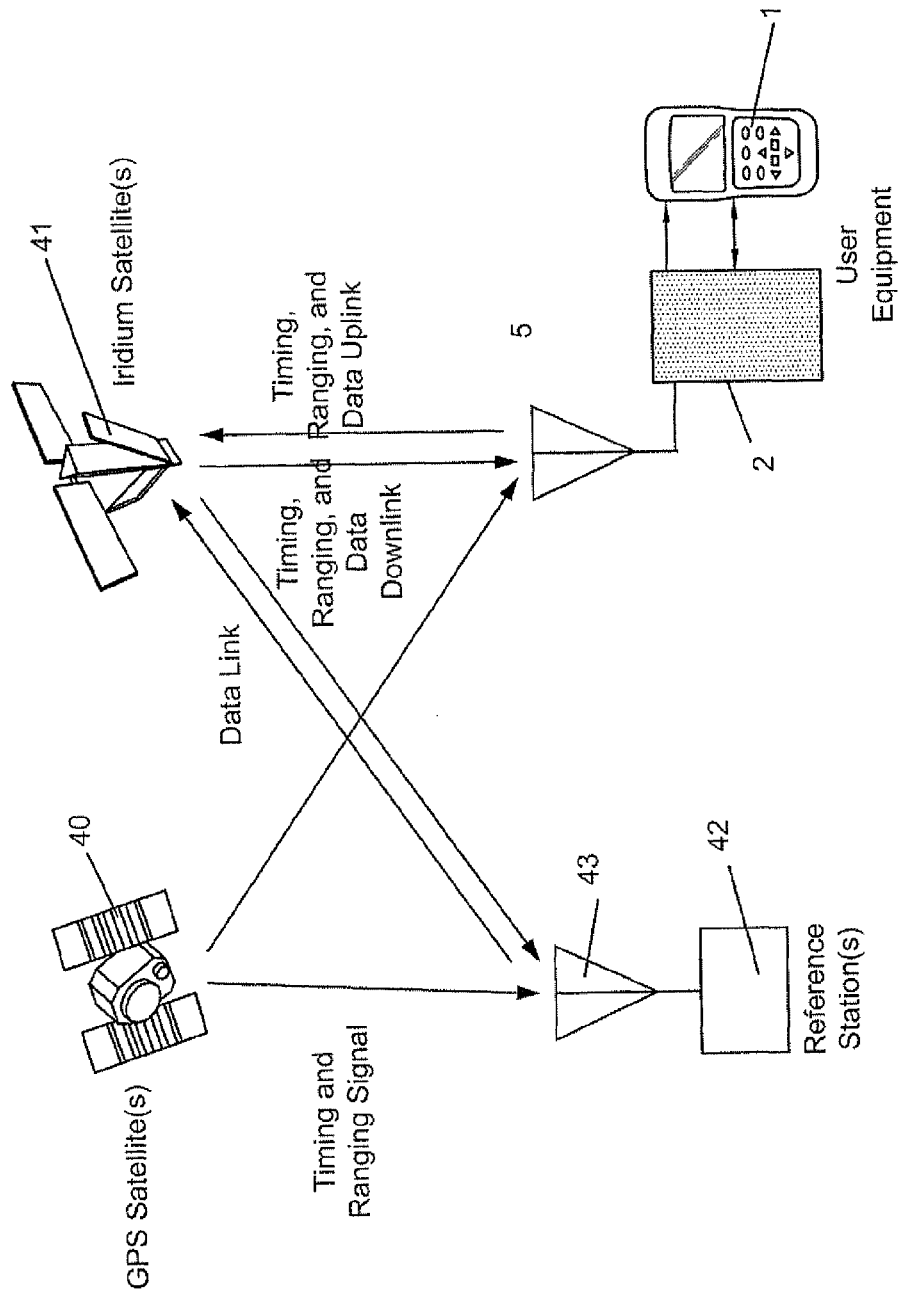

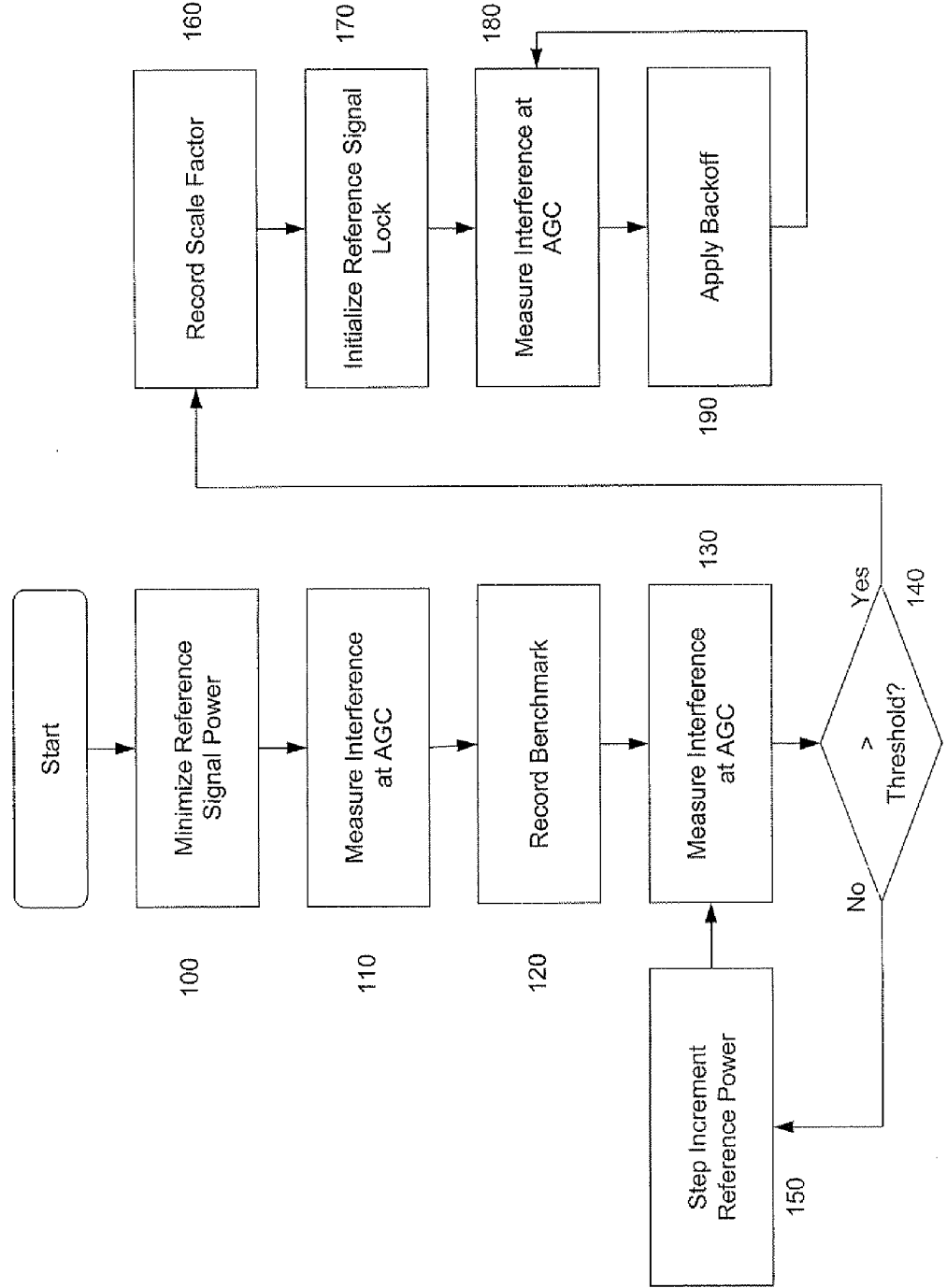

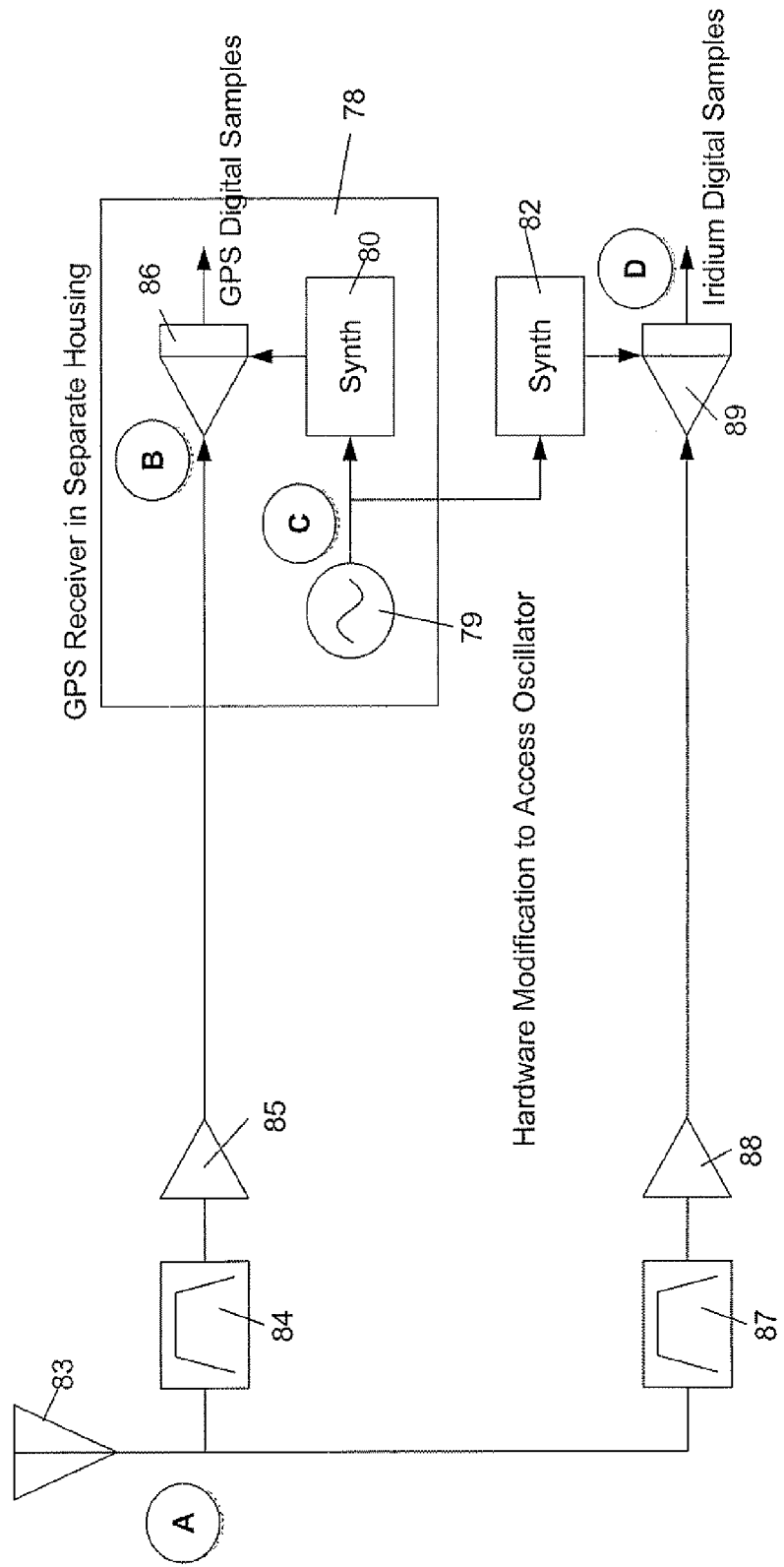
Fig 5: Phase Bias Drift Sensitivity Benchmark

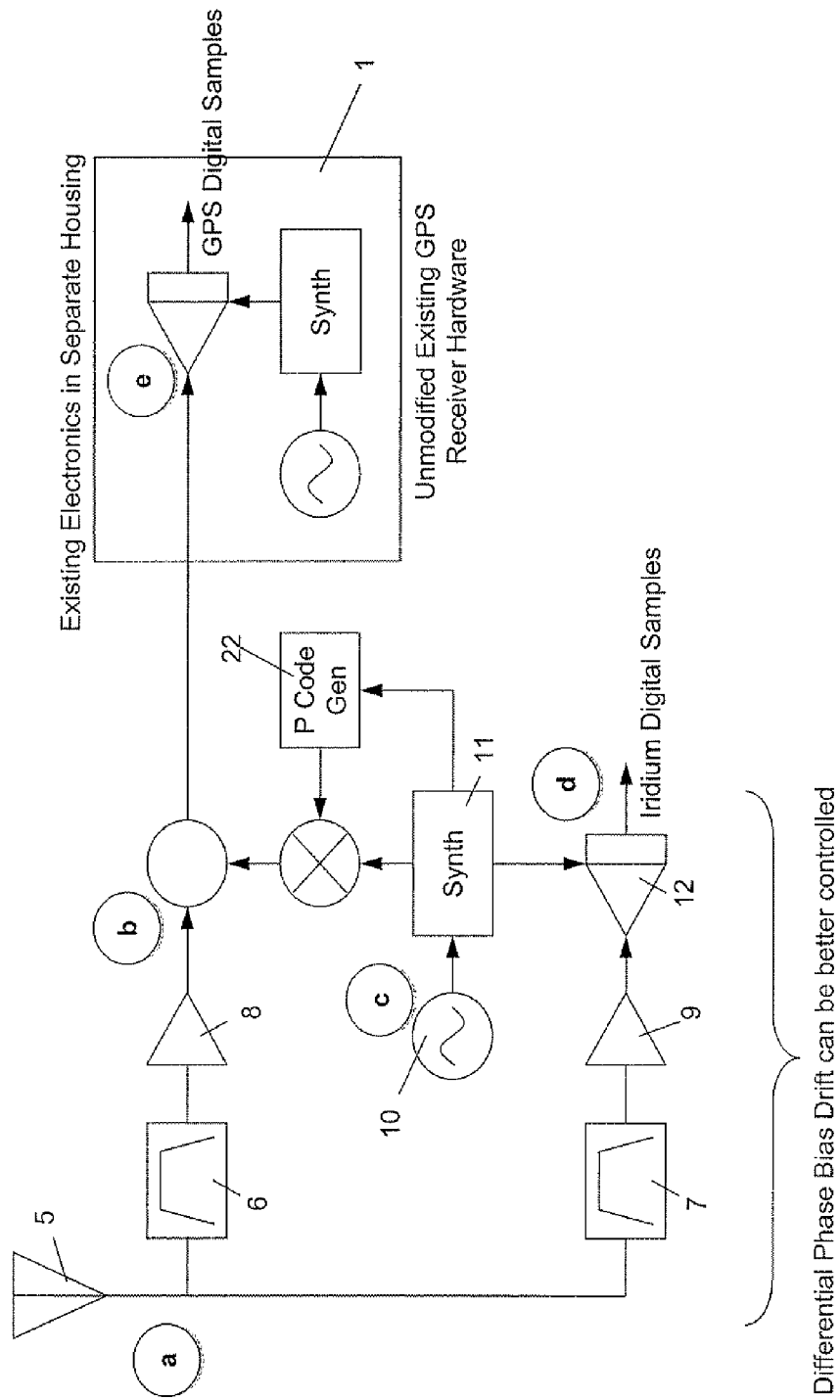
Fig 6: Phase Bias Drift Sensitivity of Preferred Embodiment

PRACTICAL METHOD FOR UPGRADING EXISTING GNSS USER EQUIPMENT WITH TIGHTLY INTEGRATED NAV-COM CAPABILITY

This invention is made with Government support under Navy Contract N00173-08-C-2074 awarded by the Naval Research Laboratory. The Government has certain rights in the invention.

BACKGROUND OF THE INVENTION

1. Field of the Invention

This invention relates to a method of upgrading existing Global Navigation Satellite System (GNSS) user equipment, such as a GPS receiver, in order to add high-performance, tightly integrated navigation and communication (Nav-Com) capability without the need to modify the existing equipment. The invention also relates to an apparatus, which may take the form of a plug-in enhancement module, for adding iGPS to existing GNSS user equipment.

In a preferred embodiment of the invention, the upgrade is to a particular tightly integrated Nav-Com system known as iGPS, which utilizes the carrier phase of signals received from Low Earth Orbiting (LEO) satellites, such as Iridium to provide a special-purpose wideband reference signal. In this embodiment, upgrade to iGPS is achieved by:

- using an existing antenna port in the GNSS user equipment to supply the GNSS user equipment with a special-purpose wideband reference signal phase locked to the reference oscillator of the apparatus;
- causing the existing GNSS user equipment to produce coherent correlations of incoming GNSS (or GPS) signals and the reference signal relative to the GNSS user equipment reference oscillator; and
- sending the coherent correlations back through an existing data port to a Nav-Com processor for combination with additional correlations of Iridium taken relative to the reference oscillator of the apparatus to derive more precise solutions for position, velocity, and/or time.

The GNSS user equipment may be a Defense Advanced GPS Receiver (DAGR), with the Nav-Com processor and special purpose reference signal generating components being provided in a single unitary module that plugs into existing ports of the DAGR, without need to modify the DAGR. This arrangement can significantly improve the accuracy, integrity, and availability of Position, Navigation, and Timing (PNT) in the DAGR, in some cases by three orders of magnitude, using carrier phase with the potential to converge onto sub-decimeter level position fixes with time frames on the order of a minute anywhere on the globe. The invention enables the high precision GNSS carrier phase observable to be more readily exploited to improve PNT availability—even under interference conditions or occluded environments. Furthermore, the invention enables new communication enhancements made available by the synthesis of precisely coupled navigation and communication modes. With the proper design and integration, the easily attached upgrade is capable of significantly lowering fielding and life cycle costs to realize the advanced capability.

2. Description of Related Art

Tightly integrated Navigation and Communication opens up a vast realm of new complementary capability for U.S. military, civil, and commercial applications, especially if such infrastructure is global in nature. Communications infrastructure can improve navigation by providing real-time data and timing aiding, while navigation infrastructure improves communication by providing time and position aiding. Employing a global infrastructure enables stakeholders to better enjoy economies of scope and scale. The more tightly integrated the architecture of the Navigation and Communication components, the greater the mutual synergies can be achieved.

One especially notable example of an integrated global Nav-Com system is iGPS, created by the fusion of the Iridium and GPS global satellite constellations. The Navy has awarded a contract to a Boeing-led team to use Iridium to provide supplemental data, timing, and ranging information to authorized GPS users. This additional information provides among other benefits the means for significantly improved interference rejection performance and faster acquisition of GPS with a dynamic user platform [Glen Gibbons, "Boeing Wins NRL Contract to Continue Iridium/GPS Development", Inside GNSS, September/October 2008].

In general iGPS, as well as the broader global Nav-Com solution set, has the potential to significantly improve the accuracy, integrity, and availability of Position, Navigation, and Timing (PNT). The rapid angle motion of LEO satellites in the sky dramatically increases spatial diversity over the traditionally slow moving GPS satellites in high orbit. If the LEO and GPS satellite carrier phase is employed, there is potential to lock onto sub-decimeter level position fixes with time frames on the order of a minute anywhere on the globe. See, for example, U.S. Pat. Nos. 6,373,432, 5,812,961, and 5,944,770.

The use of carrier phase provides significant dividends for users. The GPS L1 wavelength is approximately 19 cm. The intrinsic precision for GPS is a small fraction of this wavelength. The typical timing and ranging error budget for GPS L1 works out to be on the order of 0.5 cm RMS or 20 ps in terms of time. This precision is the key to achieving the overall position accuracy just mentioned as well as integrity and interference rejection. The iGPS infrastructure can be used to provide both data aiding (for Iridium ephemeris and GPS data stripping) as well as time stability transfer (calibrating the Iridium clock with a reference station and broadcasting precise Iridium carrier phase corrections to the user in real time), as described in U.S. Pat. No. 7,372,400.

The converse is also true. Once the user position and time are well known, new capabilities related to improved communication are possible. For example, a carrier based upon an ultra-stable virtual clock can be established between the user and a satellite because the user has full knowledge of the position and timing of each. This enables robust coherent communication links to be established to support, for example, interference resistant and low probability of intercept communications.

Traditionally, carrier phase has not been exploited by the military for navigation purposes. Instead, signal squaring techniques are employed, which have the unfortunate effect of squaring both the signal and the noise. The result has been wasted GPS signal power at a time when the military is considering development and launch of higher-power satellites to make up the shortfall. iGPS infrastructure enables more efficient use of existing GPS power.

Additional global integrated Nav-Com benefits result from further synergies. With GPS user equipment and other devices there is often a need to securely disseminate encryption keys. Without a suitable infrastructure, the process can become cumbersome. For example, with only a one-way data link, users and devices may not be able to authenticate with the key management authority. A robust, global, two-way communication system solves this problem by enabling the user and device to authenticate each request to re-key no matter where they are in the world. This ease of use enables key dissemination to be both secure and effortless.

In the case of iGPS, the U.S. has an opportunity to rapidly implement an existence proof of a LEO-based enhancement to GPS. The Iridium satellites are already on orbit with a lifetime projected to extend beyond 2014 (see "Iridium Satellite LLC Estimates Constellation Life Span To Extend Well Beyond Original Predictions," Iridium Satellite LLC Press Release, Feb. 26, 2003). Under the above-listed Navy contract, the Boeing team will develop global ground infrastructure and develop new flight software for the existing Iridium satellite constellation by the beginning of 2011. This timetable will provide several years of a suitable signal in space for the U.S. Military and other authorized users to make effective use of the new capability before the Iridium constellation degrades beyond its useful life.

However, a significant obstacle to implementing iGPS is the cost and effort to outfit user equipment such as the Defense Advanced GPS Receiver (DAGR), which remains user equipment of choice with the military. The U.S. Military has currently fielded several hundred thousand GPS units ("Rockwell Collins delivers 200,000th DAGR and 40,000th GPS engine to the U.S. Army", Rockwell Collins Press Release, Apr. 18, 2008) and many more are already in the process of procurement. The U.S. Government has purchased these units for nearly $2,000 per unit.

If the Military or other users are to adopt iGPS, there needs to be a straightforward way to take advantage of the installed base of user equipment. Prior art has so far presented two unpalatable approaches: (i) modify the existing user equipment hardware to accept a new precision iGPS interface capable of tight integration and (ii) completely replace the existing user equipment with new tightly integrated iGPS user equipment designed from scratch.

The first approach has caused significant concern because of the economic and technical risk associated with introducing a precision iGPS interface with tight integration. In particular, since the DAGR does not provide for an external oscillator input, one would have to be added. It is not clear how much this changeout would cost and to what extent it would require replacement of DAGR components. There is also a related logistical and configuration control issue that having multiple versions of DAGR hardware would become cumbersome to manage for the users and leadership because, when hardware modifications are made, many of the overall specifications will need to change and be managed. In addition, there is also technical risk associated with the hardware modifications. The carrier phase precision of iGPS for tight integration requires 20 ps stability between the GPS and Iridium signal processing components over the full range of environmental conditions. The hardware components that are especially subject to phase variation include the GPS RF front end, the Iridium RF front end, and the GPS oscillator. While the navigation processing algorithms can tolerate a slow drift of carrier phase bias between the two components, if thermal or mechanical disturbances are excessive, the system will be incapable of providing useful performance. The DAGR layout compounds the technical risk because the Iridium and GPS components are by necessity in different boxes which will be subject to different thermal and mechanical stress.

The second approach also encounters resistance. Given that the U.S. has already made a significant investment in GPS equipment, it is difficult to justify displacing existing inventory.

What is needed is a means for demonstrating the far-reaching benefits of a LEO-enhanced GPS Nav-Com system to its potential U.S. military, civil, and commercial stakeholders.

To this end what is needed is an existence proof in the form of iGPS formed by integrating Iridium and GPS wherein there is a practical and attractive method to upgrade user equipment for existing users of GPS. In other words, what is therefore needed is a practical method for creating a tightly integrated global Nav-Com upgrade to an existing DAGR that provides the full necessary precision and performance without need for any hardware modifications.

SUMMARY OF THE INVENTION

It is accordingly an objective of the invention to provide a method of upgrading GNSS user equipment with tightly integrated Nav-Com capability.

It is a second objective of the invention to provide practical method for upgrading existing GNSS user equipment with tightly integrated Nav-Com capability that is retroactively applicable to existing user equipment.

It is a third objective of the invention to provide user hardware for GNSS user equipment that is retroactively applicable to existing user equipment.

The invention thus provides a method of upgrading and tightly integrating GPS user equipment with other GNSS systems to enhance navigation performance without the need for hardware modifications to the original GPS equipment, and user hardware for implementing the method. The method provides a practical, cost-effective means for bounding adverse differential phase bias drift among critical r.f. components of tightly integrated Nav-Com user equipment. In the preferred embodiment, the performance upgrades enable tightly integrated global Nav-Com capability, and are compatible with iGPS and any other GNSS system.

In accordance with the principles of a preferred embodiment of the invention, the objectives of the invention are achieved by a method of upgrading existing Global Navigation Satellite System (GNSS) user equipment that includes the steps of: providing first GNSS user hardware including a first oscillator driving a precise coded reference signal generator arranged to generate a reference signal and supply the reference signal to an existing second GNSS user device, and a Navigation/Communication processor arranged to generate position, navigation, and/or timing signals upon receipt from the second GNSS user device of coherent correlations of incoming GNSS signals and the reference signal; providing an existing second GNSS user device separate from the first GNSS user hardware, said GNSS user device including at least one existing port and a second oscillator arranged to produce said coherent correlations of incoming GNSS signals and the reference signal generated by the add-on first GNSS hardware, and to send the coherent correlations to the first GNSS user hardware; and coupling the first GNSS user hardware to the second GNSS user device via the existing port without modifying hardware of the second GNSS user device.

The objectives of the invention are also achieved by upgrade hardware corresponding to the first GNSS user hardware of the above-described method, the upgrade hardware being arranged to generate a stable reference signal and supply it to the second GNSS user device and to combine the coherent correlations from the second GNSS device with its own raw precise correlations to derive an improved solution for position, velocity, and/or time.

Preferably, in both the method and apparatus embodiments of the invention, the at least one existing port used to couple the first GNSS user hardware with the existing second GNSS user device with the includes an antenna port and a data port, the first GNSS user hardware is arranged to send the reference signal to the second GNSS user device through the antenna port, and the first GNSS user hardware is arranged to send steering commands to the second GNSS user device and receive back the coherent correlations through the data port.

According to still further aspects of the preferred embodiments of the invention, the first GNSS user hardware includes Iridium receive capability and the second GNSS user device is a Global Positioning System (GPS) receiver, with the Iridium and GPS signals preferably being input through a common antenna. In this embodiment, the first oscillator provides a common precision oscillator carrier phase reference for both the GPS and Iridium r.f. timing and ranging measurements. In addition, the first GNSS user hardware further includes Iridium transmit capability, while either the first or second GNSS user receiver may include Y-code, M-code, C/A code, Galileo, GLONASS, and/or COMPASS capability. A reference station may be used to calibrate the code and carrier phase of satellites within view and telemeter the calibration data to a communications satellite whose broadcast output is coupled into the first GNSS user hardware and whose calibration data is employed to improve the position, velocity, and time solution.

The Navigation/Communication processor used in the preferred embodiment of the invention may include a Kalman Filter to model and estimate the user equipment position, velocity, and time using the carrier phase of the incoming signals. Optionally, the Kalman Filter may utilize observable data from an inertial measurement unit (IMU).

In addition, the first GNSS user hardware may include a transmitter component that uses its improved position, velocity, and time estimate to improve a time and frequency synchronization of its transmissions, with the transmissions being coupled to a regional communications network, satellite network, or global network of low earth orbiting satellites.

BRIEF DESCRIPTION OF THE DRAWINGS

FIG. 1 is a schematic diagram of an upgraded GNSS system including an existing GNSS user equipment and an enhancement module constructed in accordance with the principles of a preferred embodiment of the invention.

FIG. 2 is a block diagram of the system of FIG. 1.

FIG. 3 is a schematic diagram illustrating the timing, ranging, and data signals used by the system of FIG. 1.

FIG. 4 is a flowchart of a reference input initialization and control sub-routine according to a preferred method.

FIG. 5 is a schematic diagram illustrating a phase bias drift sensitivity benchmark.

FIG. 6 is a schematic diagram illustrating the phase bias drift sensitivity of the preferred method.

DETAILED DESCRIPTION OF THE PREFERRED EMBODIMENTS

FIGS. 1 and 2 are top-level functional drawings showing an upgraded GNSS system including existing GNSS user equipment, illustrated as a Defense Advanced GPS Receiver (DAGR) 1, and enhanced user hardware constructed in accordance with the principles of a preferred embodiment of the invention, which may optionally take the form of a separate add-on enhancement module 2 illustrated in FIG. 2. The enhanced user hardware is arranged to plug into existing interfaces to the user equipment, which in the exemplary DAGR include a two-way serial port 3 and an external antenna input 4.

Those skilled in the art will appreciate that it is also within the scope of the invention to adapt or modify the illustrated user hardware and method to GNSS user equipment other than a DAGR. In addition, those skilled in the art will appreciate that while the invention eliminates the need to modify existing GNSS hardware in order to implement tightly integrated Nav-Com capability, such hardware may nevertheless be modified for other reasons. Furthermore, even though the existing GNSS hardware is not modified, it may be necessary to modify the software of the existing GNSS user equipment to accommodate the enhanced PNT data inputs (for example, as described below in connection with FIG. 6). In the case of a DAGR, software upgrades can be made at the depot level or even potentially in the field. In general, the software provided in conventional GNSS user equipment may be readily changed in cooperation with the user equipment manufacturer to accommodate the higher precision inputs, enabling the existing equipment to easily be retrofitted to accommodate the upgrade.

Although the specific packaging of the user equipment can take many forms, FIG. 2 shows a preferred embodiment wherein the Nav/Com enhancement electronics are contained in a separate add-on module 2, which interfaces to the existing DAGR. As noted above, it is one object of the invention to maintain the existing DAGR hardware interfaces so as to make the upgrade as easy as possible. Therefore, it will be practical to maintain configuration control over the entire DAGR inventory with the mix of unmodified DAGRs.

As illustrated in FIGS. 1 and 2, a common antenna 5 is used for the GPS L1 and L2 receive signals and the Iridium L-band transmit and receive signals. It will nevertheless be appreciated that multiple antennas may be provided, particularly in case LEO satellites other than Iridium are used or if a commercial off the shelf (COTS) dual-band GPS active antenna is used. Each input is bandpass filtered by respective blocks 6 and 7 for the appropriate GPS or Iridium bands and then fed through a respective preamplifier 8,9.

Preferably, an oscillator 10 serves as the common timebase for the transceiver. It is an object of this invention to keep the component costs, including that for this oscillator 10, to a minimum and therefore a low-cost crystal oscillator is illustrated although, of course, one or more other oscillators with similar or better performance may be substituted. The oscillator 10 drives a synthesizer 11, which provides all the necessary A/D, D/A, and local oscillator signals for the unit.

The Iridium input is digitized by an A/D converter 12 and then fed through a Hilbert transformation processing function or circuit 13, which provides a complex representation of the incoming signal for the bank of signal processors 14. In an identical manner, the complex digitized Iridium output of the bank of signal processors 14 is combined and routed from the bank of signal processors 14 through an inverse Hilbert transform processing function or circuit 16 in preparation for D/A conversion by D/A converter 17, and power scaling by a variable attenuator 18, amplification by an amplifier 19, before being supplied to modulator 20 for transmission through antenna 5.

The Iridium transmit and received functions may be switched in accordance with a frequency and time division multiple access scheme, such as the one described in the publication entitled "Working Document on Service Link Characteristics of the Iridium Satellite System," available from US WP 7D/14R2, Feb. 11, 2005. As described therein, each 90 ms repeating frame is divided into a 20.32 ms downlink paging slot and four each 8.28 ms duplex uplink and downlink telephony slots. The Iridium portion of the integrated unit is capable of receiving both Iridium and GPS concurrently. When the Iridium user equipment is transmitting, GPS tends to be susceptible to out-of-band interference, so transmit blanking is implemented for the GPS input. If only a single Iridium time slot is used for the uplink, the 8.28 ms/90 ms duty cycle for GPS downtime amounts to an acceptable ~0.1 dB loss.

A central Navigation/Communication processor 21 directs the internal operation of the user equipment. It contains control loop drivers for a plurality of Iridium correlators implemented by signal processor bank 14, a GPS P code generator (depicted for illustrative purposes only as external to the processor 21), and a configuration control 23 for the transmit and receiver functions as well as the interface to the DAGR and an optional micro-electromechanical-system (MEMS) Inertial Measurement Unit (IMU) 24. Processor 21 also provides the master estimation capability of the user equipment in the form of a Kalman Filter which optimally combines the available information, including that from Iridium, GPS, and the IMU or other sensors, such as a barometer or magnetometer.

In order to secure the full benefits of integrated Nav-Com, the Iridium signal processing block 14 provides means for correlation and coherent detection of the incoming received signal. Driver tracking loops command the numerically controlled oscillators (NCOs) 25 in the signal processor 14. Iridium code generators 26 synthesize a replica code that matches what each Iridium satellite is known to broadcast. In the case of Iridium, which was not originally designed to be a navigation system, this replica code is selected to consist of a pre-identified series of message bits known in advance by the user to create the direct sequence chips of a spread spectrum signal. This architecture enables the timing (code) and carrier phase of the incoming Iridium signal to be determined precisely. The same architecture is used for the transmit side to ensure that the outgoing timing (code) and carrier phase can be precisely controlled.

The synthesizer also creates a sinusoidal local oscillator at the GPS L1 band at 1575.42 MHz and a square code driver clock at 10.23 MHz. These clocks are fed to the P code generator 22, which generates a reference receiver clock time P code signal at zero Doppler. The Navigation/Communication processor 21 is able to initialize the start time of the P code generator 22 to a commanded value. Based on an estimate of the incoming interference power supplemented by the Navigation/Communication processor's estimate of the GPS signal power, the processor 21 actively controls a variable attenuator 30 to ensure that the P code reference signal is strong enough to be detected under interference but not so strong so as to be an unwanted source of interference. An in-line Automatic Gain Control (AGC) 31, monitored by the Navigation/Communication processor 21, routes the incoming composite GPS and reference signal into the DAGR 1. This allows the processor 21 to track overall power emerging from the antenna terminals as well as regulate the power to a constant value coupled to the DAGR or existing GPS receiver hardware, which may or may not have an AGC and/or SFAP or STAP type signal processing which may also be controlled and integrated via the existing ports. The active control of the reference signal power is described in more detail below.

No encryption capability or authorization is required to generate the GPS P code. Therefore, it will be readily appreciated that the expansion hardware or module for the DAGR does not need to be a controlled item under Selective Availability Anti-Spoofing Module (SAASM) and, accordingly, can be made very practical and easy to interface with an existing DAGR, which natively supports P code tracking. If the target GPS receiver is a commercial C/A code receiver, C/A code can be used as well. However, P-code is preferred when possible because of its superior minimal cross correlation properties.

The DAGR 1 illustrated in FIG. 1 contains 12 GPS tracking channels, each of which can be operated within the military SAASM encryption architecture. The SAASM architecture permits operation of any given satellite to employ C/A code (the 1.023 MHz coarse/acquisition signal), P code (the 10.23 MHz precision signal), or Y code (the 10.23 MHz encrypted signal). The Navigation/Communication processor 21 communicates with the DAGR 1 via the serial port 3. The serial port 3 enables the processor 21 to individually command the code and carrier Numerically Controlled Oscillators (NCOs) for each SAASM channel and return the raw in-phase and quadrature (I and Q) GPS correlations.

In the preferred embodiment, the existing 1 Pulse Per Second (1 PPS) interface of existing GPS receivers remains available for use without changing the cable in any existing integration in which the GPS receiver is used. If GPS is not available, the Iridium or other GNSS receive capability in the add-on module can continue to accurately drive the 1 PPS via the existing interfaces.

FIG. 3 shows satellite and reference station configurations in relation to the user equipment for the global system illustrated in FIGS. 1 and 2. There can be one or more each of GPS satellites 40 and Iridium satellites 41 in view of the user equipment 1,2,5. Reference stations 42 established worldwide serve to calibrate the clock and ephemeris of each satellite in view. Each reference station 42 incorporates an antenna 43 and signal processing (not shown) that is functionally equivalent to signal processing of the user equipment except that it is operated in a controlled environment and may optionally be packaged in a rack mount.

In the illustrated embodiment, the GPS and Iridium satellites 40,41 each share a common view of both the reference station 42 and the user equipment 1,2,5 anywhere on the globe where capability is needed. Each satellite broadcasts a PRN ranging code modulated onto the carrier. Since Iridium was never designed to be a navigation satellite and broadcast a PRN ranging code, an equivalent facsimile is synthesized using one or more pre-defined data bit streams. The reference stations 42 serve to calibrate the satellite clocks in real time. Each reference station measures the code and carrier phase of all satellites in view and telemeters this information to the users via the Iridium data link. The user equipment 1,2,5 tracks the code and carrier of each satellite 40,41 in view then makes its own measurements of code and carrier phase and reads in the reference station data. Additionally, Iridium provides a reverse data path, enabling the user equipment 1,2,5 to uplink data to the satellite for relay, in this case, back to the reference station 42.

Preferably, the downlink and uplink timing and ranging functions of the preferred system are executed with centimeter-level precision, i.e., consistent with variations that are small relative to the carrier phase of the timing and ranging signals. Such precision enables rapid angle motion of low earth orbit (LEO) satellites to significantly improve accuracy and integrity above stand-alone GPS. This precision is also key to enable sustained coherent integration of a GPS signal subject to interference. To accomplish this, a suitable flywheel, such as the illustrated Inertial Measurement Unit (IMU) 24 of FIG. 1, is used for feedforward to carry out GPS tracking in both time and space. For example, if an IMU can provide a centimeter-level position flywheel, and Iridium can provide a high-power, 20 ps level (centimeter-level in terms of speed-of-light conversion) timing source, then the GPS signal can be coherently integrated for a sustained period of time. The overall integrated Nav-Com system resembles a lock-in amplifier often employed in sensitive physics experiments. Iridium, the real-time reference station calibration, and a stable treatment of the various local oscillators used between GPS and Iridium within the user equipment are important design attributes. In the presence of interference, an ordinary GPS signal is too faint to be registered.

By accurately modeling and estimating the satellite and user position state including clock parameters, iGPS establishes a replica carrier phase for the incoming GPS signal that to the centimeter level almost exactly matches that of the incoming faint signal—even though the user may be undergoing significant dynamics. Over time the user equipment is able to integrate an error signal, generating I and Q components that can be used as observables to close the receiver tracking loops—even under interference conditions. The intrinsic precision also enables important uplink capability, and enables the provision of user equipment capable of generating sustained phase stability in the uplink channel—even under dynamics.

With a carrier stable to the centimeter-level of phase over intervals of many seconds, it is possible to improve the uplink interference rejection as well as engage in LPI communication. Such uplink improvement is accomplished by enabling the user to precisely spread the data modulation over frequency and time.

The Navigation/Communication processor controls the user equipment processes and data flow and includes a Kalman Filter comprised of a precise model based on the user state and a means to optimally manage the user equipment process and measurement noise. Table 1 provides a listing of the key Navigation/Communication processor attributes.

TABLE 1

Navigation/Communication Processor Architecture Definitions

| Processor Attribute | Parameter List |
|---|---|
| Aiding Information | GPS Data Bits |
| | GPS Clock |
| | Iridium Clock |
| | Iridium Ephemeris |
| Observables | IMU 3 axis Rates and Accelerations |
| | GPS Early, Punctual, Late Correlations |
| | Iridium Early, Punctual, Late Correlations |
| Kalman Filter States | UE Clock Bias, Rate |
| | DAGR Clock Bias, Rate |
| | 3 axis Position |
| | 3 axis Velocity |
| | 3 axis Attitude |
| | 3 axis IMU Accelerometer Bias |
| | 3 axis IMU Rate Gyro Bias |
| | Power for each GPS Signal |
| | GPS Carrier Phase Biases |
| | Iridium Carrier Phase Bias, Rate, and Acceleration |
| Control Outputs | GPS Correlator NCO Commands |
| | Iridium Correlator NCO Commands |
| | Iridium Transmit NCO Commands |

The Aiding Information listed in Table 1 is that provided via data link from the Iridium satellite. The observables are the raw measurements collected from GPS, Iridium, and the IMU. In addition, optional sensors that also include a low-cost magnetometer and barometric altimeter may be provided. The Kalman Filter States listed in Table 1 are those nominally estimated in the user equipment in a practical scenario. Finally, the NCO control outputs are listed which drive the signal processing hardware. These commands are calculated as functions of the Kalman Filter state parameters. Proper power control of the reference input signal to the DAGR is crucial. If the power is too high, the reference will jam the DAGR. If it is too low, the signal will be undetectable and the system will lose its utility. The strategy adopted to control the signal is chosen to track the incoming interference level but be subject to an additional backoff. This ensures that the overall performance is driven by the incoming interference. As an additional safeguard during operations, the incoming GPS signal power is monitored to ensure that it is independent of the reference signal power.

FIG. 4 is a flowchart of an initialization and operational control method that embodies principles of a preferred embodiment of the invention. The first step 100 upon device power up is for the add-on user hardware to turn off the reference signal, followed by the step 110 of measuring the incoming interference noise and the step 120 of recording the measured interference noise in order to obtain a benchmark of incoming noise power against which to compare with the reference signal. The reference signal power is incremented in dB steps and interference is measured (step 130) until the AGC function detects that the reference power dominates the incoming interference power (steps 140 and 150). Based on this calibration, the add-on GNSS user equipment carries out the step 160 of calculating and recording a scale factor between the commanded reference signal power and the detected input power to the AGC. Once the calibration is complete, the reference signal is expected to be readily accessible to the DAGR signal processor with high carrier-to-noise ratio.

The next step 170 is to initialize a reference signal lock. In order to do so, an approximate time can be obtained by sending round trip messages across the serial port of the existing GNSS user equipment. An approximate time and frequency search window is derived based on the serial port messages and a priori information about the likely oscillator frequency offsets. Then, one of the DAGR correlator channels is allocated to the reference signal, and the Navigation/Communication processor 21 commands the channel to sweep through the defined frequency and time search window to acquire and track the reference signal.

Upon reference signal track, steady state is achieved and initialization step 170 is complete. In step 180, the interference is then measured at the AGC, so that in step 190, nominal operating mode establishes a backoff for the reference signal of approximately 30 dB from the incoming interference level.

As a further sanity check, the Navigation/Communication processor 21 can introduce a dither power level onto the reference signal with a time constant on par with the GPS integration time constant and potentially greater than 10 seconds. The Kalman filter in the Navigation/Communication processor 21 of the embodiment illustrated in FIG. 1, which estimates the power of the incoming GPS signals, nominally tracks the power of each. If the tracked signal power becomes appreciably correlated with the reference power, the reference power may be too high and should be adjusted downward.

It is an advantage of the preferred embodiment of the invention that it provides a common precision oscillator reference for both the GPS and Iridium r.f. timing and ranging measurements, especially for the carrier phase components. A stable carrier phase reference common to both the GPS and Iridium platforms unlocks the previously untapped efficiency of coherent processing techniques for a GPS incoming signal power level in the military and other applications described above. In particular, the stability of the GPS and Iridium platforms must be good to within a small fraction of the 19 cm L band wavelength of each other. The requirement translates into about 0.5 cm in terms of distance or 20 ps in terms of time. This is a demanding level of precision, especially when biases in electronics that change with the environment, such as temperature or mechanical stress, induce fluctuations. Although the Kalman Filter can be designed to accommodate a limited degree of bias fluctuation, the practical benefits of integrated Nav-Com are quickly lost in practical operational scenarios if such fluctuations are excessive. The result is user equipment that cannot operate.

Without loss of generality FIG. 5 shows a traditional approach to integrating existing GPS user equipment with new Iridium transceiver capability so as to maintain tight inter-channel phase coherence. In addition to the data port that is required for such integration, a common oscillator is provided by physically altering the receiver 78 and introducing a common hardware oscillator 79 that is shared between GPS and Iridium. As illustrated, the common oscillator 79 is connected to the GPS code synthesizer 80 and in addition is connected through an added port 81 to an Iridium code synthesizer 82. The GPS code synthesizer 80 is connected to respective signal inputs including common antenna 83, GPS filter 84, pre-amplifier 85, and digitizer 86, while the Iridium code synthesizer is connected to common antenna 83, Iridium filter 87, pre-amplifier 88, and digitizer 89.

The following analysis traces the bias sensitivity of this conventional approach. In particular, the stability of node B versus that of node D will be evaluated against a requirement to stay stable to the level of <<20 ps for intervals of 1 minute or longer. Many details are neglected for the purposes of this analysis, including the fact that many GPS receivers have r.f. front ends downconverting to an intermediate frequency. However, without loss of generality, a direct downconversion to baseband is assumed for this analysis. Further analysis shows that similar conclusions will be reached supporting the improved stability of the preferred embodiment shown in FIG. 6.

The analysis assumes a BPSK signal which is the format of the GPS waveform. Since Iridium employs QPSK, the BPSK analysis remains applicable by the principle of superposition. The incoming signal at node 1, $s_1(t)$, is given by $$s_1(t)=d(t)c(t)\cos[\omega_0 t+\phi(t)]$$

where $d(t)$ is the data modulation, $c(t)$ is the PRN chipping sequence, $\omega_0$ is the nominal center angular frequency of the band, and $\phi(t)$ is the incoming carrier phase of the received signal. The signal propagates through signal paths A-B and A-D, which adds biases $b_{21}$ and $b_{41}$ respectively.

$$s_2(t)=d(t)c(t)\cos[\omega_0 t+\phi(t)+t\, b_{21}]$$

$$s_4(t)=d(t)c(t)\cos[\omega_0 t+\phi(t)+b_{41}]$$

The oscillator has a nominal phase output assumed to be receiver clock time, $t_3(t)$, as measured at node C.

$$t_3=t+\tau(t)$$

where $\tau$ is the instantaneous receiver clock bias as measured at node C. The common oscillator drives a synthesizer with two taps, one for the GPS processing path and one for the Iridium processing path. Each synthesizer and associated interconnect electronics routed to nodes B and D induce path biases $b_{32}$ and $b_{43}$. The resulting receiver clock time as measured at each node is given by $$t_2(t)=t+\tau(t)+b_{23} \text{ and } t_4(t)=t+\tau(t)+b_{43}$$

Each signal is then sampled at nodes B and D by a separate A/D converter. Each A/D converter samples the signal when its input of receiver clock time reaches a multiple of the sampling period T as follows for the case of node B:

$$t_2(t)=t+\tau(t)+b_{23}=kT$$

Solving for the time $t_{A/D}[k,2]$ at which sample k is made at node B, $$t_{A/D}[k,2]=kT-\tau(t_{A/D}[k,2])-b_{23}$$

Inserting the sampling time for node B into the received signal expression for node B, $$s_2(t_{A/D}[k,2])=d_{k,2}c_{k,2}\cos[\omega_0 kT-\omega_0\tau(t_{A/D}[k,2])-\omega_0 b_{23}+\phi_{A/D}[k,2])+b_{21}]$$

The equivalent expression for node D is $$s_4(t_{A/D}[k,4])=d_{k,4}c_{k,4}\cos[\omega_0 kT-\omega_0\tau(t_{A/D}[k,4])-\omega_0 b_{43}+\phi(t_{A/D}[k,4])+b_{41}]$$

The code and data for each channel are wiped off downstream. Any phase contributions of the modulation and its processing are neglected herein. The carrier phase difference for any sample k between node C and node D is then taken directly as the difference between the cosine arguments for each signal as follows:

$$\Delta\phi_{24}[k] = \angle s_2(t_{A/D}[k,2]) - \angle s_4(t_{A/D}[k,4])$$
$$= \omega_0 kT - \omega_0\tau(t_{A/D}[k,2]) - \omega_0 b_{23} + \phi(t_{A/D}[k,2]) + b_{21}$$
$$-\omega_0 kT + \omega_0\tau(t_{A/D}[k,4]) + \omega_0 b_{43} - \phi(t_{A/D}[k,4]) - b_{41}$$

For an LEO satellite moving at <~8 km/sec, the time tagging error at baseband is assumed to be sufficiently small such that the incoming signal phase, $\phi$, and receiver clock bias, $\tau$, is independent of choice of sample time reference. The term $\omega_0$ becomes as a scale factor for unit conversion between time and phase angle. Simplifying to retain the substantive terms of the instantaneous r.f. bias behavior, $$\Delta\phi_{24}\approx(b_{21}-b_{41})-\omega_0(b_{23}-b_{43})$$

The implications of this result for a traditional benchmark configuration in FIG. 5 do not readily support tightly integrated Nav-Com. Two or more separate mechanical housings are required for the overall integrated device if hardware changes are to be minimized. For many practical integrations, it is either necessary or desirable to spatially separate the housings and interconnect each via cable. Each of the bias terms above will be subject to separate temperature sensitivity. Each housing may operate at a different temperature. Any given pair of bias terms has the potential to be balanced for differential cancellation, but it can be readily appreciated that such balancing is difficult, especially if the existing housing and electronics of the DAGR is to remain unaltered.

For example, the term $b_{23}$ and its thermal sensitivity profile are internal to the DAGR and is not under the control of the user equipment integrator. A counterpart term $b_{21}$ may or may not span different hardware platforms, but nevertheless is subject to a different thermal and mechanical environment that makes it difficult for an integrator to differentially cancel against term $b_{23}$ in a robust and practical way. Similarly, the term $b_{41}$ may or may not share the same mechanical housing external to the DAGR (for example if an external antenna is used) and will not readily cancel against the term $b_{12}$, which must always span housings into the DAGR. Last, term $b_{41}$ may or may not share a mechanical housing outside of the DAGR but must nevertheless balance term $b_{43}$ which must always span different housings and is therefore subject to thermal, mechanical, and other environmental stress.

Taken in the aggregate, environmental stresses, including thermal and mechanical, can introduce unacceptable excursions when the requirement is sustained stability to the 20 ps level. It can be readily appreciated that such environmental stresses cannot be readily controlled or mitigated without physical alterations to the existing DAGR hardware. Unfortunately, such physical alteration defeats the core objective of offering a practical upgrade path for tightly integrated Nav-Com.

FIG. 6, on the other hand, depicts the subject invention in a simplified form that can be readily analyzed for environmental phase stability in the same manner as FIG. 5. As before the purpose of the next analysis is to assess the intrinsic stability between node e of the DAGR and node d of the add-on module. The add-on module receiver clock time is generated at node c of the add-on module is given by $$t_3(t)=t+\tau(t)$$

The receiver clock time at nodes d and e are also given as $$t_4(t)=t+\tau(t)+b_{43}$$

$$t_5(t)=t+\tau(t)+b_{23}+b_{52}$$

A new interface reference signal, r(t), is modulated with GPS P code, p(t). The P code is generated by the add-on module and conveyed to node e as follows:

$$r_5(t) = p(t_5(t))\cos[\omega_0 t_5(t)]$$
$$= p(t + \tau(t) + b_{23} + b_{52})\cos[\omega_0(t + \tau(t) + b_{23} + b_{52})]$$

Even prior to tracking any incoming signals, the Kalman filter begins propagating estimates of the iGPS add-on module clock bias, τ(t), and the DAGR clock bias, $\tau_{DAGR}$ (t). The reference signal pseudorange measurement has high signal to noise ratio and is assumed to heavily weight the carrier phase precision of the reference signal to effectively phase lock the oscillators from the add-on module and the GPS receiver. The DAGR replica of the same signal is given by $$\hat{r}_{DAGR5}(t) = p(t_{DAGR5}(t))\cos[\omega_0 t_{DAGR5}(t)]$$
$$= p(t + \tau_{DAGR}(t) + \rho(t))\cos[\omega_0(t + \tau_{DAGR}(t) + \rho(t))]$$

The pseudorange observable, ρ(t), as measured by the DAGR correlator steered by the Navigation/Communication processor in the add-on module in phase and delay lock is then $$\rho(t)=\tau(t)-\tau_{DAGR}(t)+b_{23}+b_{52}$$

Although upon power up only the relative module clock biases are observed, the actual clock bias can be resolved once the receiver is tracking satellites. Once the iGPS add-on receiver, the existing GPS receiver, or both start tracking, enough information becomes available for the Kalman filter to begin estimating position, time, and, to the extent applicable, the other states listed in Table 1 above.

Employing an identical analytical approach for the new method, the signal as measured at node e is given by $$s_5(t)=d(t)c(t)\cos[\omega_0(t+b_{52})+\phi(t)+b_{21}]$$

The aggregate signal available at node e is then the sum of the incoming $s_5$ (t) and $r_5$(t). Because the inner details of the DAGR or any other GPS or GNSS receiver are generally proprietary or otherwise protected, a simplified model of the front end is assumed. Again, without loss of generality, a direct down conversion is assumed for the purpose of this analysis, which is assumed to be readily extensible to other specific cases. The DAGR is assumed to have a distinct sample interval, $T_{DAGR}$, versus the Nav-Com add-on module with sample rate, T. As above the A/D sample times are computed in terms of receiver clock time and then solved in terms of the actual time each measurement, m, is made.

$$t_5(t) = t + \tau_{DAGR}(t) = mT_{DAGR}$$

$$t_{A/D}[m, 5] = mT_{DAGR} - \tau_{DAGR}(t_{A/D}[m, 5])$$

The resulting A/D converter output at node e is $$s_5(t_{A/D}[m,5])=d_{m,5}c_{m,5}\cos[\omega_0 mT_{DAGR}-\omega_0\tau_{DAGR}(t_{A/D}[m,5])+\omega_0 b_{52}+\phi(t_{A/D}[m,5])+b_{21}]$$

The signal and A/D clock at node d are treated in the same way as before $$s_4(t_{A/D}[k,4])=d_{k,4}c_{k,4}\cos[\omega_0 kT-\omega_0\tau(t_{A/D}[k,4])-\omega_0 b_{43}+\phi(t_{A/D}[k,4])+b_{41}]$$

Before the phase of the two signals can be compared, it is vital that the signal processing take into account the time tag of the r.f. sampling events, especially for the r.f. phase terms, $\omega_0 mT_{DAGR}$ and $\omega_0 kT$. In general, both r.f. and baseband terms must have a sampling stability <<20 ps for a sustained period of time, preferably for times on the order of 1 minute or more. For convenience of analysis, A/D samples between the DAGR and Nav-Com add-on module are paired such that they occur at approximately the same time. In general, because the two clocks are running asynchronously and because two separate sampling rates are assumed, there is no expectation that any given samples across platforms will occur at exactly the same time.

The following development provides an explicit calculation of the elapsed time between any given cross-platform samples. First, the receiver clock time for each sample is recalled as $$t_5(t_{A/D}[m,5])=t_{A/D}[m,5]+\tau(t_{A/D}[m,5])+b_{23}+b_{52}$$

$$t_4(t_{A/D}[k,4])=t_{A/D}[k,4]+\tau(t_{A/D}[k,4])+b_{43}$$

Next, a matched pair of A/D samples, $k_m$ and $m_k$, is selected such that the sample times are near each other, i.e., within a sample or so. If a ~50 MHz sample clock is assumed, then a given pair of samples will generally occur within 0.02 of each other. For any given pair of samples, the difference in time between sample epochs in receiver clock time is given by $\delta t_{LO}$ as follows.

$$\delta t_{LO}=t_5(t_{A/D}[m_k,5])-t_4(t_{A/D}[k_m,4])$$

Substituting the above relationships for receiver clock time, the time difference is shown to apply to elapsed time after accounting for the component biases as follows $$\delta t_{Lo} \approx t_{A/D}[m_k,5]-t_{A/D}[k_m,4]+b_{23}+b_{52}-b_{43}$$

It is assumed that the clock bias does not change appreciably within the time span of $\delta t_{Lo}$. The next step is to substitute the following conversions between sample times and receiver clock times $$t_{A/D}[k_m,4]=k_m T-\tau(t_{A/D}[k_m,4])-b_{43}$$

$$t_{A/D}[m_k,5]=m_k T_{DAGR}-\tau_{DAGR}(t_{A/D}[m_k,5])$$

such that $$\delta t_{Lo} \approx m_k T_{DAGR}-\tau_{DAGR}(t_{A/D}[m_k,5])-k_m T+\tau(t_{A/D}[m_k,5])+b_{23}+b_{52}$$

Substituting the above expression for inter-platform pseudorange evaluated at each DAGR sample epoch, $$\rho(t_{A/D}[m,5])=\tau(t_{A/D}[m,5])-\tau_{DAGR}(t_{A/D}[m,5])+b_{23}+b_{52}$$

An explicit expression for $\delta t_{LO}$ is then given by $$\delta t_{LO} \approx m_k T_{DAGR} - k_m T + \rho(t_{A/D}[m_k, 5])$$

The parameters on the right are all available to the receiver in real time. The resulting phase rotation $\omega_0 \delta t_{LO}$ can then be applied to DAGR raw correlations to the extent necessary to project them onto a common time base with those from the Nav-Com add-on module.

It is well known that the set of GPS P codes and Y codes are effectively orthogonal. For the purpose of this sensitivity analysis, it assumed that (i) the phase of signal $s_5$ can be independently tracked from the phase of signal $r_5$ and (ii) that any phase bias contribution from code and data wipeoff can be neglected. Calculating the incoming signal phase relative to the reference phase at node e, the following expression is obtained:

$$\begin{aligned}\Delta\phi_{54}[m_k, k_m] &= \angle s_5(t_{A/D}[m_k, 5]) - \angle s_4(t_{A/D}[k_m, 4]) - \omega_0 \delta t_{LO} \\ &\approx \omega_0 m_k T_{DAGR} - \omega_0 \tau_{DAGR}(t_{A/D}[m_k, 5]) + \omega_0 b_{52} + \\ &\quad \phi(t_{A/D}[m_k, 5]) + b_{21} - \\ &\quad \omega_0 k_m T + \omega_0 \tau(t_{A/D}[k_m, 4]) + \omega_0 b_{43} - \\ &\quad \phi(t_{A/D}[k_m, 4]) - b_{41} - \\ &\quad \omega_0 m_k T_{DAGR} + \omega_0 k_m T - \omega_0 \rho(t_{A/D}[m, 5])\end{aligned}$$

The above expression for the known pseudorange of the reference signal as measured via the DAGR correlators is substituted to eliminate reference to the DAGR clock bias. Also substituted is the above expression for $\delta t_{LO}$. Furthermore, as in the analysis for FIG. 5, it is assumed that the baseband values of relative clock bias, $\tau$, and satellite carrier phase, $\phi$, stay effectively constant across the chosen sampling epochs. The tolerance for baseband time tags is relatively loose compared with the overall 20 ps requirement for phase stability. Assuming that a LEO satellite velocity relative to user does not exceed 8 km/sec and that the frequency error of the user equipment oscillators is also bounded by this velocity (equivalent to much less than 40 kHz at L band), then a time tag accuracy of 0.1 µs is sufficient to bound phase errors to a small fraction of a wavelength. Simplifying, the final result is given by $$\Delta\phi_{54} \approx (b_{21} - b_{41}) - \omega_0(b_{23} - b_{43})$$

This is the identical equation from the previous analysis. However, it is readily appreciated that by applying the method described herein and from inspection of FIG. 6, all four of the above r.f. biases are now in the complete control of the designer of the add-on unit. The biases no longer depend in any way on the bias characteristics of the DAGR. By this analysis, the design is independent of the environment associated with the integration. The designer is free to use practical techniques such as pairing components along the two r.f. paths or pairing components along the two clock paths to achieve differential cancellation. Furthermore, since it is now possible to place all the bias sensitive components on the same circuit card or even substrate of a single chip, the designer also has practical means to ensure that thermal, mechanical, or any other environmental stresses are minimized or balanced.

Taken in the aggregate, the invention enables a stock DAGR to be upgraded at the depot level without changes to the hardware. Since only the software is changed in the DAGR, it remains useful for its original purposes when it is in stand-alone form. Therefore, such a DAGR with software modifications does not pose practical impact to logistics, operations, or maintenance.

The combination of the tightly integrated upgrade unit and a built-in global communications link also enables certain benefits to logistics. The software could be placed in the flash memory of the iGPS add-on component. DAGR reprogramming is already carried out via the serial port to which the iGPS add-on component must connect to anyway. A reprogramming switch could be used to change iGPS add-on component into a reprogramming mode, and the standard DAGR reprogramming could be used. Another approach would be to send the new DAGR software load via Iridium.

Using standard interfaces described herein, the DAGR is upgraded to become iGPS user equipment capable of tightly integrated global Nav-Com. Because the invention enables practical upgrade of existing DAGRs, there is no need to procure new military GPS receivers if the Military is to find benefit with iGPS during the remaining lifetime of the Iridium constellation. Therefore, the invention facilitates the demonstration of iGPS itself by making it practical to field and test. Furthermore, iGPS as a hybrid constellation of LEO and MEO navigation satellites with integrated Nav-Com capability, the invention helps provide an existence proof for more advanced future global integrated Nav-Com to be developed.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention. For example, the method described herein, once understood by one skilled in the art, can be readily broadened to include a family of embodiments as well as user equipment that includes iGPS and regional networks as well as other LEO and GNSS global Navigation and Communication applications. It is therefore intended that the invention not be limited by the above description or accompanying drawings, but that it be defined solely in accordance with the appended claims.

What is claimed is:

1. A method of upgrading existing Global Navigation Satellite System (GNSS) user equipment, comprising the steps of:
   providing first GNSS user hardware including a first oscillator driving a precise coded reference signal generator arranged to generate a reference signal and supply the reference signal to an existing second GNSS user device, and a Navigation/Communication processor arranged to generate position, navigation, and/or timing signals upon receipt from the second GNSS user device of coherent correlations of incoming GNSS signals and the reference signal;
   providing an existing second GNSS user device separate from the first GNSS user hardware, said second GNSS user device including at least one existing port and a second oscillator arranged to produce said coherent correlations of incoming GNSS signals and the reference signal generated by the add-on first GNSS hardware, and to send the coherent correlations to the first GNSS user hardware,
   coupling the first GNSS user hardware to the second GNSS user device via the existing port without modifying hardware of the second GNSS user device.

2. The method of claim 1, wherein the first GNSS user hardware combines the coherent correlations from the second GNSS device with its own raw precise correlations to derive a precise solution for position, velocity, and/or time.

3. The method of claim 1, wherein the at least one existing port includes an antenna port and a data port, the first GNSS user hardware is arranged to send the reference signal to the second GNSS user device through the antenna port, and the first GNSS user hardware is arranged to send steering commands to the second GNSS user device and receive back the coherent correlations through the data port.

4. The method of claim 3, wherein the first GNSS user hardware includes Iridium receive capability and the second GNSS user device is a Global Positioning System (GPS) receiver.

5. The method of claim 4, wherein Iridium and GPS signals are input through a common antenna.

6. The method of claim 4, wherein the first oscillator provides a common precision oscillator reference for both the GPS and Iridium r.f. timing and ranging measurements.

7. The method of claim 6, wherein the first oscillator provides a carrier phase reference common to both the GPS and Iridium platforms.

8. The method of claim 4, wherein the second GNSS user device is a Defense Advance GPS Receiver (DAGR).

9. The method of claim 4, wherein the first GNSS user hardware further includes Iridium transmit capability.

10. The method of claim 9, wherein the first GNSS user hardware also includes Y-code, M-code, and/or C/A code tracking capability.

11. The method of claim 9, wherein the second GNSS receiver also includes M-code capability.

12. The method of claim 9, wherein the second GNSS receiver also includes Galileo, GLONASS and/or COMPASS capability, or is a commercial C/A code receiver.

13. The method of claim 1, further comprising the step of employing a Kalman Filter in the first GNSS user device to model and estimate the user equipment position, velocity, and time using the carrier phase of the incoming signals.

14. The method of claim 13, further comprising the step of using a reference station to calibrate the code and carrier phase of satellites within view and telemeter the calibration data to a communications satellite whose broadcast output is coupled into the first GNSS user hardware and whose calibration data is employed to improve the position, velocity, and time solution.

15. The method of claim 14, wherein the Kalman Filter includes observable data from an inertial measurement unit (IMU).

16. The method of claim 14, wherein the first GNSS User hardware includes a transmitter component that uses its improved position, velocity, and time estimate to improve a time and frequency synchronization of its transmissions.

17. The method of claim 16, wherein the transmissions are coupled to a regional communications network.

18. The method of claim 16, where the transmissions are coupled to a satellite network.

19. The method of claim 18, where the transmissions are coupled to a global network of low earth orbiting satellites.

20. The method of claim 1 wherein the first GNSS user hardware is an upgrade module that includes Iridium receive capability and said Navigation/Communication processor is a central Navigation/Communication processor for directing internal operation of the upgrade module, said Navigation/Communication processor including control loop drivers for Iridium correlators implemented by a signal processor bank, a GPS P code generator, and a configuration control for transmit and receiver functions as well as an interface to the second GNSS user device.

21. The method of claim 20, wherein the Navigation/Communication processor further includes an interface to a microelectromechanical-system (MEMS) inertial measurement unit (IMU).

22. The method of claim 20, wherein the Navigation/Communication processor further includes respective interfaces for receiving signals from a barometer and/or magnetometer.

23. The method of claim 20, wherein the signal processor bank synthesizes a replica code that matches what each iridium satellite is known to broadcast, the replica code consisting of a pre-identified series of message bits known in advance by the user to create direct sequence chips of a spread spectrum signal, thereby enabling the time and carrier phase of an incoming Iridium signal to be determined.

24. The method of claim 20, wherein the Navigation/Communication processor actively controls a variable attenuator to ensure that a P code reference signal is strong enough to be detected under interference but not so strong as to be a source of unwanted interference.

25. The method of claim 20, wherein the Navigation/Communication processor monitors an Automatic Gain Control (AGC) and routes an incoming composite GPS and navigation signal into the second GNSS user equipment in order to track overall power emerging from antenna terminals and regulate the power to a constant value.

26. The method of claim 20, wherein the first GNSS user hardware executes a reference input initialization and control routing including the steps of:
  a. minimizing reference signal power;
  b. measuring interference at an automatic gain control (AGC);
  c. recording a benchmark based on the measured interference;
  d. step incrementing reference signal power and measuring interference at the AGC until a threshold is reached and recording a scale factor;
  e. initialing reference signal lock;
  f. again measuring interference at the AGC; and
  g. applying backoff.

27. Add-on first Global Navigation Satellite System (GNSS) user hardware for upgrading an existing second GNSS user device by adding tightly integrated Nav-Com capability without having to modify the existing second GNSS user device, comprising:
  a first oscillator driving a precise coded reference signal generator arranged to generate a reference signal and supply the reference signal to an existing second GNSS user device;
  a Navigation/Communication processor arranged to generate position, navigation, and/or timing signals upon receipt from the second GNSS user device of coherent correlations of incoming GNSS signals and the reference signal; and
  at least one port for coupling the add-on GNSS user hardware to the second GNSS user device through an existing port of the second GNSS user device without modifying hardware of the second GNSS user device.

28. Add-on GNSS user hardware as claimed in claim 27, wherein the add-on GNSS user hardware combines the coherent correlations from the second GNSS device with its own raw precise correlations to derive a precise solution for position, velocity, and/or time.

29. Add-on GNSS user hardware as claimed in claim 27, wherein the at least one existing port includes an antenna port and a data port, the add-on GNSS user hardware is arranged to send the reference signal to the second GNSS user device through the antenna port, and the add-on GNSS user hardware is arranged to send steering commands to the second GNSS user device and receive back the coherent correlations through the data port.

30. Add-on GNSS user hardware as claimed in claim 27, wherein the add-on GNSS user hardware includes Iridium receive capability and the second GNSS user device is a Global Positioning System (GPS) receiver.

31. Add-on GNSS user hardware as claimed in claim 30, wherein the second GNSS user device is a Defense Advance GPS Receiver (DAGR).

32. Add-on GNSS user hardware as claimed in claim 30, wherein the add-on GNSS user hardware further includes Iridium transmit capability.

33. Add-on GNSS user hardware as claimed in claim 32, wherein the first GNSS user hardware also includes Y-code, M-code, and/or C/A code tracking capability.

34. Add-on GNSS user hardware as claimed in claim 32, wherein the second GNSS user device also includes M-code capability.

35. Add-on GNSS user hardware as claimed in claim 32, wherein the second GNSS user device also includes Galileo, GLONASS and/or COMPASS capability, or is a commercial C/A code receiver.

36. Add-on GNSS user hardware as claimed in claim 27, wherein the Navigation/Communication processor includes a Kalman Filter in the second GNSS user device to model and estimate the user equipment position, velocity, and time using the carrier phase of the incoming signals.

37. Add-on GNSS user hardware as claimed in claim 36, wherein a reference station is used to calibrate the code and carrier phase of satellites within view and telemeter the calibration data to a communications satellite whose broadcast output is coupled into the add-on GNSS user hardware and whose calibration data is employed to improve the position, velocity, and time solution.

38. Add-on GNSS user hardware as claimed in claim 37, wherein the Kalman Filter includes observable data from an inertial measurement unit (IMU).

39. Add-on GNSS user hardware as claimed in claim 37, wherein the add-on GNSS user hardware includes a transmitter component that uses its improved position, velocity, and time estimate to improve a time and frequency synchronization of its transmissions.

40. Add-on GNSS user hardware as claimed in claim 39, where the transmissions are coupled to a regional communications network.

41. Add-on GNSS user hardware as claimed in claim 39, where the transmissions are coupled to a satellite network.

42. Add-on GNSS user hardware as claimed in claim 41, wherein the transmissions are coupled to a global network of low earth orbiting satellites.

43. Add-on GNSS user hardware as claimed in claim 27, wherein the first and second GNSS user equipment share a common antenna.

44. Add-on GNSS user hardware as claimed in claim 27, wherein the add-on GNSS user hardware is an upgrade module that includes Iridium receive capability, and the Navigation/Communication processor is a central Navigation/Communication processor contained in the upgrade module for directing internal operation of the upgrade module, said Navigation/Communication processor including control loop drivers for Iridium correlators implemented by a signal processor bank, a GPS P code generator, and a configuration control for transmit and receiver functions as well as an interface to the second GNSS user device.

45. Add-on GNSS user hardware as claimed in claim 44, wherein the Navigation/Communication processor further includes an interface to a micro-electromechanical-system (MEMS) inertial measurement unit (IMU).

46. Add-on GNSS user hardware as claimed in claim 44, further comprising respective interfaces to a barometer and/or magnetometer.

47. Add-on GNSS user hardware as claimed in claim 44, wherein the signal processor bank synthesizes a replica code that matches what each Iridium satellite is known to broadcast, the replica code consisting of a pre-identified series of message bits known in advance by user to create direct sequence chips of a spread spectrum signal, thereby enabling the time and carrier phase of an incoming Iridium signal to be determined.

48. Add-on GNSS user hardware as claimed in claim 44, wherein the Navigation/Communication processor actively controls a variable attenuator to ensure that a P code reference signal is strong enough to be detected under interference but not so strong as to be a source of unwanted interference.

49. Add-on GNSS user hardware as claimed in claim 44, wherein the Navigation/Communication processor monitors an Automatic Gain Control (AGC) and routes an incoming composite GPS and navigation signal into the second GNSS user device in order to track overall power emerging from antenna terminals and regulate the power to a constant value.

* * * * *